March 7, 1933.  M. J. ANDERSON  1,900,149
BRAKE MECHANISM FOR CONVEYERS
Filed Oct. 8, 1930  2 Sheets-Sheet 1
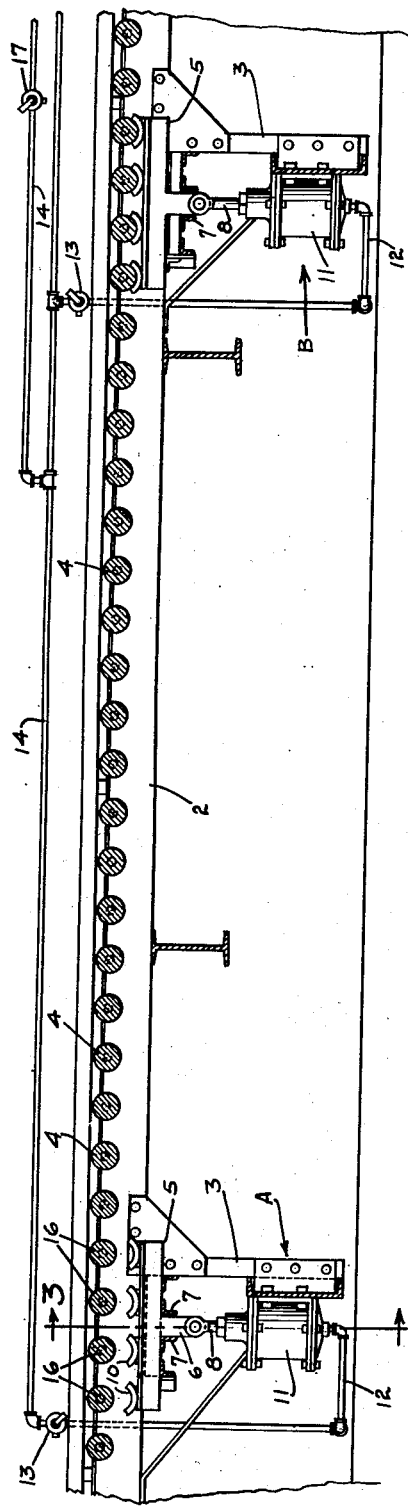
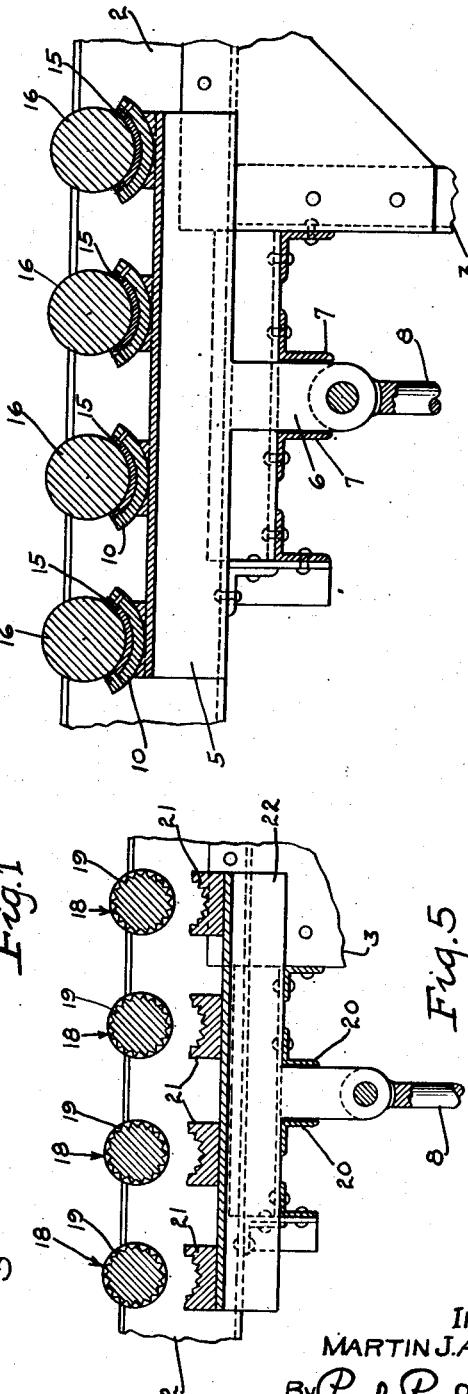
INVENTOR
MARTIN J. ANDERSON
By Paul, Paul & Moore
ATTORNEYS March 7, 1933.  M. J. ANDERSON  1,900,149
BRAKE MECHANISM FOR CONVEYERS
Filed Oct. 8, 1930   2 Sheets-Sheet 2
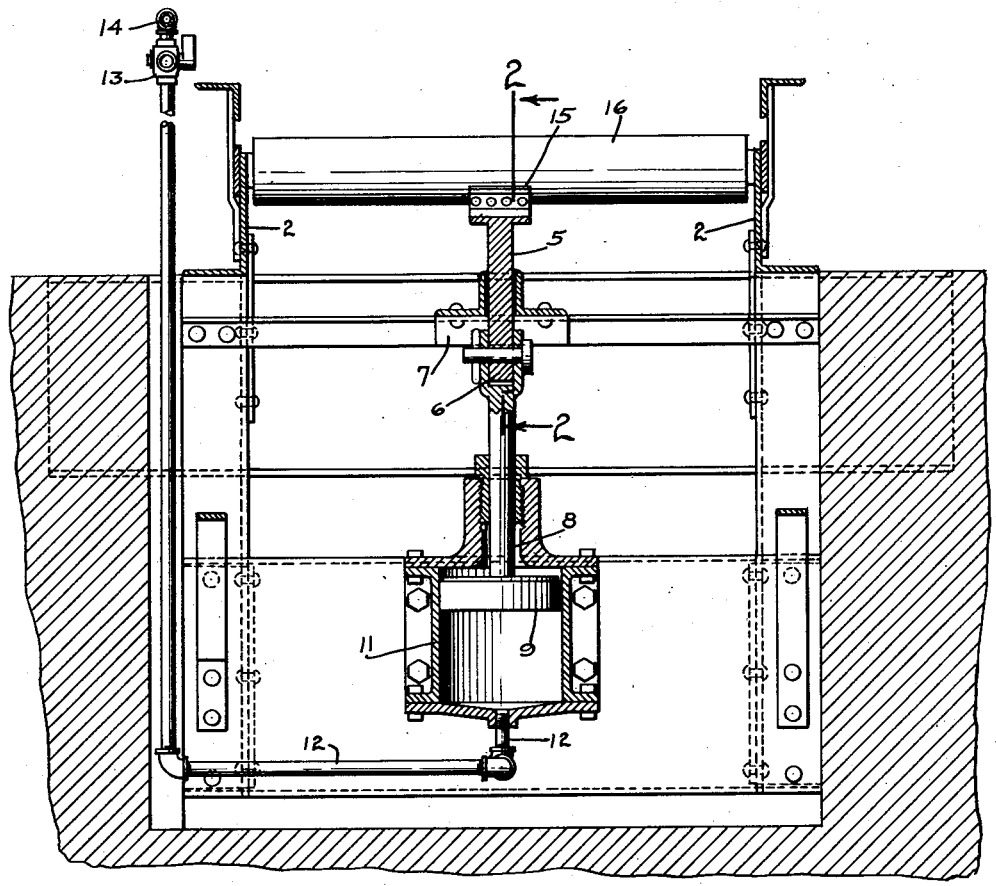
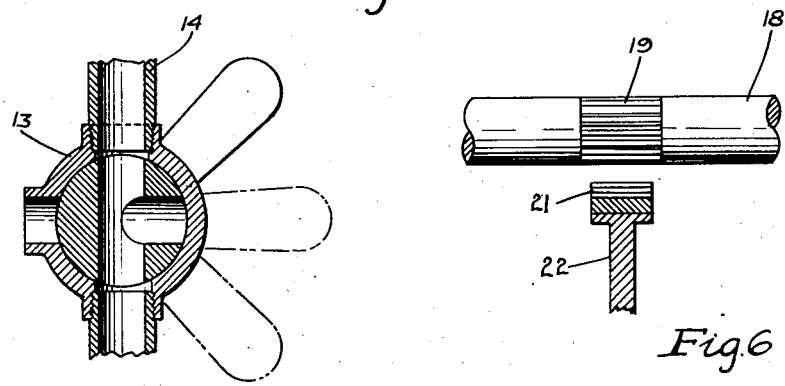
Fig.3
Fig.4
Fig.6
INVENTOR
MARTIN J. ANDERSON
ATTORNEYS Patented Mar. 7, 1933

1,900,149

UNITED STATES PATENT OFFICE

MARTIN J. ANDERSON, OF ELLWOOD CITY, PENNSYLVANIA, ASSIGNOR TO MATHEWS CONVEYER COMPANY, OF ELLWOOD CITY, PENNSYLVANIA, A CORPORATION OF PENNSYLVANIA

BRAKE MECHANISM FOR CONVEYERS

Application filed October 8, 1930. Serial No. 487,229.

This invention relates to an improved brake mechanism particularly adapted for use in connection with conveyers of the roller type to control the rotation of certain of the rollers of said conveyer whereby the movement of commodities traveling over the conveyer system may be controlled.

An object of the invention is to provide in connection with a conveyer including a plurality of anti-friction rollers, a member mounted beneath said rollers and supported in suitable guides and having brake elements mounted thereon each adapted to engage a roller of the conveyer to retard or interrupt the movements of said rollers, and fluid-operated means being provided for actuating said member whereby all of said brake elements may be moved into and out of engagement with their respective rollers to control the rotation thereof.

A further object is to provide a conveyer system including a gravity conveyer comprising a plurality of rollers adapted to support the articles to be conveyed, and having a plurality of brake mechanisms arranged in spaced relation and each adapted to engage groups of the conveyer rollers to retard or completely interrupt their rotation, whereby the movement of commodities traveling over the conveyer may be controlled, and each of said mechanisms comprising a pressure fluid cylinder having a piston mounted therein and operatively connected with said brake elements for moving the latter into and out of engagement with their respective rollers, and a valve being provided for independently controlling the supply of air to and from each cylinder whereby said brake mechanisms may be independently and selectively actuated to control the traveling movement of articles passing over the conveyer.

A further object is to provide a conveyer including a plurality of anti-friction rollers, certain of which have portions of their peripheries provided with longitudinally extending teeth or ridges, and a member being mounted beneath said ridged portions of said conveyer rollers and provided with a plurality of toothed elements adapted to be moved into and out of engagement with the toothed portions of said rollers, whereby the rotation of said rollers may be controlled, and pneumatically operated means being connected with said member for actuating the latter to move said toothed elements into and out of engagement with their respective rollers.

Other objects of the invention will appear from the following description and accompanying drawings and will be pointed out in the annexed claims.

In the accompanying drawings, there has been disclosed a structure designed to carry out the various objects of the invention, but it is to be understood that the invention is not confined to the exact features shown as various changes may be made within the scope of the claims which follow.

In the drawings:

Figure 1 is a longitudinal sectional view showing a conveyer with the invention embodied in the construction thereof;

Figure 2 is an enlarged detail sectional view on the line 2—2 of Figure 3;

Figure 3 is an enlarged cross-sectional view substantially on the line 3—3 of Figure 1;

Figure 4 is an enlarged detail sectional view showing a form of valve for controlling the flow of pressure fluid to and from the cylinders;

Figure 5 is a view showing another construction wherein certain of the conveyer rollers have portions of their peripheries provided with longitudinally extending teeth or ridges adapted to be engaged by elements having correspondingly shaped toothed surfaces, some of the parts being omitted; and Figure 6 is a fragmentary detail view showing a portion of the surface of one of the rollers provided with longitudinally extending grooves and ridges.

In the selected embodiment of the invention here shown, there is illustrated in Figure 1, a portion of a conventional type of conveyer including side frame members 2—2 supported upon a suitable frame structure 3 and provided with a plurality of anti-friction rollers 4. In Figure 1, the conveyer is shown arranged at a slight incline so that articles delivered thereto may travel thereover by gravity.

A feature of the present invention resides in the means provided for controlling the rotation of certain of the conveyer rollers whereby the movement of commodities or articles traveling over the conveyer system may be controlled.

As shown in Figures 1, 2, and 3, each brake mechanism comprises a vertically movable member 5 shown provided with a depending portion 6 mounted in suitable guides 7 and having the piston rod 8 of a piston 9 pivotally connected therewith. The piston 9 is mounted for reciprocal movement in a suitable cylinder 11, having a pipe 12 connected with the bottom thereof which leads to a suitable control valve 13 having a pipe 14 connecting it with a suitable source of fluid pressure, not shown.

A plurality of brake elements 10, each shown faced with a suitable brake lining 15, are supported upon the member 5 in spaced relation, and are adapted to peripherally engage the conveyer rollers 16, as best shown in Figure 2. When the brake elements are engaged with their respective rollers, as shown in Figure 2, rotation of the latter will be retarded, so that when a commodity traveling over the conveyer system engages the rollers 16, it will be retarded or its movement may be completely interrupted. When it is desired to release the commodity, the control valve 13 is manipulated to permit the release of the air from the lower portion of the cylinder, whereby the member 5 is depressed and the rollers 16 permitted to rotate.

In the drawings, I have shown two brake mechanisms, one indicated by the letter A and the other by the letter B. The two brake mechanisms A and B are shown connected with the supply pipe 14, as shown in Figure 1, and each is provided with a control valve 13 whereby said mechanisms may be actuated independent of each other.

A master control valve 17 is shown provided in the supply pipe 14. When the two control valves 13 are positioned to supply air to the cylinder, the two brake mechanisms may be operated simultaneously by manipulation of the master valve 17. This arrangement may be desirable in some installations.

Figures 5 and 6 illustrate a construction wherein each conveyer roller 18 has a portion of its periphery provided with longitudinally extending ridges or teeth, as indicated at 19 in Figures 5 and 6. Elements 21 having correspondingly shaped toothed faces adapted to interlock with the ridged faces 19 of the rollers 18, are supported upon a member 22 mounted in suitable guides 20. The member 22 is adapted to be connected with the piston rod 8 in the manner shown and described with reference to Figures 2 and 3. In the construction shown in Figures 5 and 6, the rollers 18 may be brought to a positive stop by moving the elements 21 into engagement with the toothed surfaces of their respective rollers.

The above described brake mechanism is very simple and inexpensive and it has been found particularly useful in connection with anti-friction roller conveyers, as herein disclosed. By the use of these brake mechanisms, the movement of commodities traveling over the conveyer system may be controlled at will by the simple manipulation of the control valves 13, so that when light and heavy articles are conveyed over the same system, the movement of the larger and heavier articles may be retarded to allow the lighter articles to travel over the system without interference from the heavier articles.

I claim as my invention:

1. The combination with a gravity conveyer comprising a plurality of anti-friction rollers, of a series of brake devices arranged at intervals along said conveyer and each having means adapted to frictionally engage certain of the rollers of said conveyer to retard their rotation, an actuator for each brake device, and a control means for said actuators whereby said devices may be operated independently of one another, or simultaneously, to control the movement of articles over said conveyer.

2. The combination with a gravity conveyer comprising a plurality of anti-friction rollers, of a series of brake devices arranged at intervals along said conveyer and each having means adapted to frictionally engage certain of the rollers of said conveyer to retard their rotation, a fluid-operated actuator for each brake device, means for supplying a pressure fluid to said actuators, and a plurality of control valves by which said brake devices may be operated independently of one another, or simultaneously, to control the movement of articles over said conveyer.

In witness whereof, I have hereunto set my hand this 1st day of October, 1930.

MARTIN J. ANDERSON.